US012737305B2

(12) United States Patent
Iizawa et al.

(10) Patent No.: US 12,737,305 B2
(45) Date of Patent: Sep. 15, 2026

(54) DATA TRANSFER CONTROLLER AND INFORMATION PROCESSING DEVICE

(71) Applicants: 1FINITY Inc., Kawasaki (JP); NTT, Inc., Tokyo (JP)

(72) Inventors: Ken Iizawa, Oiso (JP); Teruaki Ishizaki, Musashino (JP); Sampath Priyankara, Musashino (JP); Takahiro Kawahara, Musashino (JP)

(73) Assignees: 1FINITY Inc., Kawasaki (JP); NTT, Inc., Tokyo (JP)

( * ) Notice: Subject to any disclaimer, the term of this patent is extended or adjusted under 35 U.S.C. 154(b) by 0 days.

(21) Appl. No.: 19/034,301

(22) Filed: Jan. 22, 2025

(65) Prior Publication Data

US 2025/0252064 A1 Aug. 7, 2025

(30) Foreign Application Priority Data

Feb. 1, 2024 (JP) ................................ 2024-014079

(51) Int. Cl.
*G06F 13/16* (2006.01)

(52) U.S. Cl.
CPC .................................... *G06F 13/16* (2013.01)

(58) Field of Classification Search
CPC ...................................................... G06F 13/16
See application file for complete search history.

(56) References Cited

U.S. PATENT DOCUMENTS 5,664,152 A 9/1997 Ezzet
12,137,464 B2 * 11/2024 Sebire ..................... H04L 5/001
2005/0175036 A1 8/2005 Umezaki
2017/0285942 A1 * 10/2017 Yang .................. G06F 11/1048

FOREIGN PATENT DOCUMENTS

JP 09-006711 A 1/1997
JP 2015-176569 A 10/2015
WO WO 2004/093445 A1 10/2004

* cited by examiner

*Primary Examiner* — Steven G Snyder
*Assistant Examiner* — John B Roche
(74) *Attorney, Agent, or Firm* — Arent Fox Schiff LLP

(57) ABSTRACT

A data transfer controller for controlling transfer of a plurality of data items from a first device to a plurality of second devices includes a processor configured to transfer at least one data item of a plurality of data items that is to be transferred from the first device to the plurality of second devices, to at least one first memory, upon occurrence of a condition in which an hourly transfer volume of the plurality of data items transferred from the first device to a switch exceeds a bandwidth between the first device and the switch, and to cause the plurality of second devices to acquire the at least one data item that is stored in the at least one first memory.

9 Claims, 15 Drawing Sheets

10
MEMORY
60
BUS(3b)
SWITCH
50
BUS(3b)
40(2)
SECOND DEVICE
41
INTERNAL MEMORY
b
BUS(3b)
40(1)
SECOND DEVICE
41
INTERNAL MEMORY
3b
BUS(3b)
20
FIRST DEVICE
21
INTERNAL MEMORY
4b
BANDWIDTH EXCEEDED
DATA
30
DATA TRANSFER CONTROLLER

MEMORY
60
BUS(3b)
3b
b
SWITCH
50
SECOND DEVICE
40(2)
40(1)
INTERNAL MEMORY
41
FIRST DEVICE
20
21
30
DATA TRANSFER CONTROLLER
BANDWIDTH IS SATISFIED
DATA
10

FIG.5

300 TRANSFER CONTROL UNIT

DATA AMOUNT MANAGEMENT TABLE 301

| STREAM DATA | FLOW RATE |
|---|---|
| 1 | b |
| 2 | b |
| 3 | b |
| 4 | b |

TRANSFER DESTINATION MANAGEMENT TABLE 302

| STREAM DATA | GPU IN USE |
|---|---|
| 1 | GPU1, GPU2, GPU3, GPU4 |
| 2 | GPU1, GPU2, GPU3 |
| 3 | GPU1, GPU2 |
| 4 | GPU1 |

AREA MANAGEMENT TABLE 303

| STREAM DATA | STORAGE DEVICE | PCIe BUS ADDRESS SPACE |
|---|---|---|
| 1 | FPGA | 0x3000~0x30FF |
| 2 | FPGA | 0x3100~0x31FF |
| 3 | FPGA | 0x3200~0x32FF |
| 4 | FPGA | 0x3300~0x33FF |

MEMORY MANAGEMENT TABLE 304

| MEMORY | AVAILABLE CAPACITY | AVAILABLE BANDWIDTH (UPSTREAM) FROM PCIe SWITCH TO MEMORY | AVAILABLE BANDWIDTH (DOWNSTREAM) FROM MEMORY TO PCIe SWITCH |
|---|---|---|---|
| HOST MEMORY | $C_{HM}$ | B | B |
| CXL MEMORY 1 | $C_{CM1}$ | B | B |
| CXL MEMORY 2 | $C_{CM2}$ | B | B |

FIG.7

300 TRANSFER CONTROL UNIT

DATA AMOUNT MANAGEMENT TABLE 301

| STREAM DATA | FLOW RATE |
|---|---|
| 1 | b |
| 2 | b |
| 3 | b |
| 4 | b |

TRANSFER DESTINATION MANAGEMENT TABLE 302

| STREAM DATA | GPU IN USE |
|---|---|
| 1 | GPU1, GPU2, GPU3, GPU4 |
| 2 | GPU1, GPU2, GPU3 |
| 3 | GPU1, GPU2 |
| 4 | GPU1 |

AREA MANAGEMENT TABLE 303

| STREAM DATA | STORAGE DEVICE | PCIe BUS ADDRESS SPACE |
|---|---|---|
| 1 | CXL MEMORY 1 | 0x1000~0x10FF |
| 2 | CXL MEMORY 2 | 0x2000~0x20FF |
| 3 | FPGA | 0x3200~0x32FF |
| 4 | FPGA | 0x3300~0x33FF |

MEMORY MANAGEMENT TABLE 304

| MEMORY | AVAILABLE CAPACITY | AVAILABLE BANDWIDTH (UPSTREAM) FROM PCIe SWITCH TO MEMORY | AVAILABLE BANDWIDTH (DOWNSTREAM) FROM MEMORY TO PCIe SWITCH |
|---|---|---|---|
| HOST MEMORY | $C_{HM}$ | B | B |
| CXL MEMORY 1 | $C_{CM1}$~0x100 | 0.8B | 0.2B |
| CXL MEMORY 2 | $C_{CM2}$~0x100 | 0.8B | 0.4B |

FIG.10

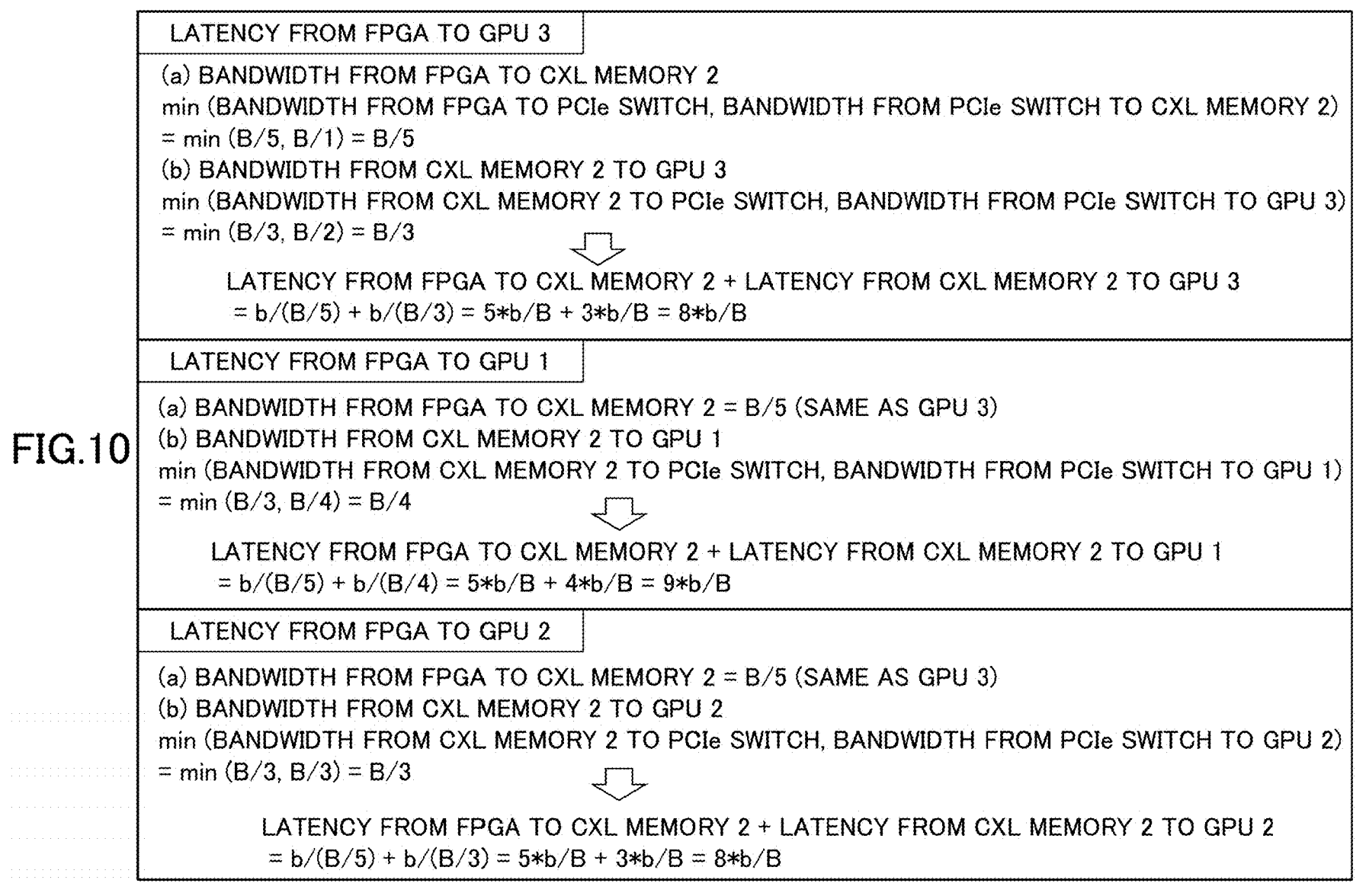

LATENCY FROM FPGA TO GPU 3

(a) BANDWIDTH FROM FPGA TO CXL MEMORY 2
min (BANDWIDTH FROM FPGA TO PCIe SWITCH, BANDWIDTH FROM PCIe SWITCH TO CXL MEMORY 2)
= min (B/5, B/1) = B/5
(b) BANDWIDTH FROM CXL MEMORY 2 TO GPU 3
min (BANDWIDTH FROM CXL MEMORY 2 TO PCIe SWITCH, BANDWIDTH FROM PCIe SWITCH TO GPU 3)
= min (B/3, B/2) = B/3

⇩

LATENCY FROM FPGA TO CXL MEMORY 2 + LATENCY FROM CXL MEMORY 2 TO GPU 3
= b/(B/5) + b/(B/3) = 5*b/B + 3*b/B = 8*b/B

LATENCY FROM FPGA TO GPU 1

(a) BANDWIDTH FROM FPGA TO CXL MEMORY 2 = B/5 (SAME AS GPU 3)
(b) BANDWIDTH FROM CXL MEMORY 2 TO GPU 1
min (BANDWIDTH FROM CXL MEMORY 2 TO PCIe SWITCH, BANDWIDTH FROM PCIe SWITCH TO GPU 1)
= min (B/3, B/4) = B/4

⇩

LATENCY FROM FPGA TO CXL MEMORY 2 + LATENCY FROM CXL MEMORY 2 TO GPU 1
= b/(B/5) + b/(B/4) = 5*b/B + 4*b/B = 9*b/B

LATENCY FROM FPGA TO GPU 2

(a) BANDWIDTH FROM FPGA TO CXL MEMORY 2 = B/5 (SAME AS GPU 3)
(b) BANDWIDTH FROM CXL MEMORY 2 TO GPU 2
min (BANDWIDTH FROM CXL MEMORY 2 TO PCIe SWITCH, BANDWIDTH FROM PCIe SWITCH TO GPU 2)
= min (B/3, B/3) = B/3

⇩

LATENCY FROM FPGA TO CXL MEMORY 2 + LATENCY FROM CXL MEMORY 2 TO GPU 2
= b/(B/5) + b/(B/3) = 5*b/B + 3*b/B = 8*b/B

FIG.11

TRANSFER CONTROL UNIT 300

DATA AMOUNT MANAGEMENT TABLE 301

SAME AS FIG. 7

TRANSFER DESTINATION MANAGEMENT TABLE 302

SAME AS FIG. 7

AREA MANAGEMENT TABLE 303

| STREAM DATA | STORAGE DEVICE | PCIe BUS ADDRESS SPACE |
|---|---|---|
| 1 | CXL MEMORY 1 | 0x1000~0x10FF |
| 2 | CXL MEMORY 2 | 0x2000~0x20FF |
| 3 | FPGA | 0x3200~0x32FF |
| 4 | FPGA | 0x3300~0x33FF |

MEMORY MANAGEMENT TABLE 304

| MEMORY | AVAILABLE CAPACITY | AVAILABLE BANDWIDTH (UPSTREAM) FROM PCIe SWITCH TO MEMORY | AVAILABLE BANDWIDTH (DOWNSTREAM) FROM MEMORY TO PCIe SWITCH |
|---|---|---|---|
| HOST MEMORY | $C_{HM}$ | B | B |
| CXL MEMORY 1 | $C_{CM1}$~0x100 | 0.8B | 0.2B |
| CXL MEMORY 2 | $C_{CM2}$~0x100 | 0.8B | 0.2B |
| GPU1 | $C_{G1}$ | 0.2B | B |
| GPU2 | $C_{G2}$ | 0.4B | B |
| GPU3 | $C_{G3}$ | 0.6B | B |
| GPU4 | $C_{G4}$ | 0.8B | B |

LATENCY MANAGEMENT TABLE 305

| | STREAM DATA 1 | STREAM DATA 2 | STREAM DATA 3 | STREAM DATA 4 |
|---|---|---|---|---|
| GPU1 | NOT REQUIRED | 10*b/B | NOT REQUIRED | NOT REQUIRED |
| GPU2 | NOT REQUIRED | 10*b/B | NOT REQUIRED | – |
| GPU3 | NOT REQUIRED | 5*b/B | – | – |
| GPU4 | NOT REQUIRED | – | – | – |

FIG.13

300 TRANSFER CONTROL UNIT

DATA AMOUNT MANAGEMENT TABLE 301

SAME AS FIG. 7

TRANSFER DESTINATION MANAGEMENT TABLE 302

SAME AS FIG. 7

AREA MANAGEMENT TABLE 303

| STREAM DATA | STORAGE DEVICE | PCIe BUS ADDRESS SPACE |
|---|---|---|
| 1 | CXL MEMORY 1 | 0x1000–0x10FF |
| 2 | GPU3 | 0x6000–0x60FF |
| 3 | FPGA | 0x3200–0x32FF |
| 4 | FPGA | 0x3300–0x33FF |

MEMORY MANAGEMENT TABLE 304

| MEMORY | AVAILABLE CAPACITY | AVAILABLE BANDWIDTH (UPSTREAM) FROM PCIe SWITCH TO MEMORY | AVAILABLE BANDWIDTH (DOWNSTREAM) FROM MEMORY TO PCIe SWITCH |
|---|---|---|---|
| HOST MEMORY | $C_{HM}$ | B | B |
| CXL MEMORY 1 | $C_{CM1}-0x100$ | 0.8B | 0.2B |
| CXL MEMORY 2 | $C_{CM2}$ | B | B |
| GPU1 | $C_{G1}$ | 0.2B | B |
| GPU2 | $C_{G}$ | 0.4B | B |
| GPU3 | $C_{G32}-0x100$ | 0.6B | 0.6B |
| GPU4 | $C_{G4}$ | 0.8B | B |

LATENCY MANAGEMENT TABLE 305

| | STREAM DATA 1 | STREAM DATA 2 | STREAM DATA 3 | STREAM DATA 4 |
|---|---|---|---|---|
| GPU1 | NOT REQUIRED | 10*b/B | NOT REQUIRED | NOT REQUIRED |
| GPU2 | NOT REQUIRED | 10*b/B | NOT REQUIRED | – |
| GPU3 | NOT REQUIRED | 5*b/B | – | – |
| GPU4 | NOT REQUIRED | – | – | – |

FIG.14

LATENCY FROM FPGA TO GPU 3

(a) BANDWIDTH FROM FPGA TO GPU 3
min (BANDWIDTH FROM FPGA TO PCIe SWITCH, BANDWIDTH FROM PCIe SWITCH TO GPU 3)
= min (B/5, B/2) = B/5

LATENCY FROM FPGA TO GPU 3
= b/(B/5) = 5*b/B (≦ 5*b/B)

LATENCY FROM FPGA TO GPU 1

(a) BANDWIDTH FROM FPGA TO GPU 3 = B/5 (SAME AS GPU 3)
(b) BANDWIDTH FROM GPU 3 TO GPU 1
min (BANDWIDTH FROM GPU 3 TO PCIe SWITCH, BANDWIDTH FROM PCIe SWITCH TO GPU 1)
= min (B/2, B/4) = B/4

LATENCY FROM FPGA TO GPU 3 + LATENCY FROM GPU 3 TO GPU 1
= b/(B/5) + b/(B/4) = 5*b/B + 4*b/B = 9*b/B (≦10*b/B)

LATENCY FROM FPGA TO GPU 2

(a) BANDWIDTH FROM FPGA TO GPU 3 = B/5 (SAME AS GPU 3)
(b) BANDWIDTH FROM GPU 3 TO GPU 2
min (BANDWIDTH FROM GPU 3 TO PCIe SWITCH, BANDWIDTH FROM PCIe SWITCH TO GPU 2)
= min (B/2, B/3) = B/3

LATENCY FROM FPGA TO GPU 3 + LATENCY FROM GPU 3 TO GPU 2
= b/(B/5) + b/(B/3) = 5*b/B + 3*b/B = 8*b/B (≦10*b/B)

START
S200
IS THERE GPU THAT DOES NOT MEET LATENCY REQUIREMENTS?
NO
YES
S202
CHECK IF STREAM DATA NOT MEETING LATENCY REQUIREMENTS CAN BE MOVED TO INTERNAL MEMORY OF GPU THAT DOES NOT MEET LATENCY REQUIREMENTS
S204
MOVABLE?
NO
YES
S206
UPDATE MEMORY MANAGEMENT TABLE AND LATENCY REQUIREMENT MANAGEMENT TABLE
END

DATA TRANSFER CONTROLLER AND INFORMATION PROCESSING DEVICE

CROSS-REFERENCE TO RELATED APPLICATIONS

This application is based upon and claims the benefit of priority of the prior Japanese Patent Application No. 2024-014079, filed on Feb. 1, 2024, the entire contents of which are incorporated herein by reference.

FIELD

The embodiments discussed herein are related to data transfer controllers and information processing devices.

BACKGROUND

In a computer system in which a host bus, via which CPUs (Central Processing Units) and a memory are connected, and an I/O (Input/Output) bus, via which I/O devices are connected, are mutually connected via a bus bridge, bus performance may deteriorate due to memory access contention between the CPUs and the I/O devices. In view of the above situation, a method is proposed in which segmented memories are respectively connected to the host bus and the I/O bus, and in which data transfer between the I/O devices is performed via a given segmented memory connected to the I/O bus, as described in Japanese Laid-open Patent Publication No. 09-006711, for example.

In an image transmission device capable of performing live streaming, when data encoded by an encoding unit is written to a live streaming memory and a storage medium, if bus performance deteriorates due to data write contention on a bus, real-time performance may not be ensured. In view of the above situation, a method is proposed in which a dedicated bus connected to the storage medium is provided and data is written to the storage medium without using a bus that is connected to a memory, as described in International Publication Pamphlet No. WO 2004093445, for example.

In an image display information processing device including a video memory connected to a common bus and a main memory connected to a local bus, if the common bus is occupied by display data, processing using the common bus may become impossible. In view of the above situation, a method is proposed in which a transfer frequency of the display data from the main memory to the video memory is lower than a write frequency of the display data to the main memory, as described in Japanese Laid-open Patent Publication No. 2015-176569, for example.

Recently, systems have been developed that combine a plurality of accelerators with different specialized processing and that transfer one or more data items, among a plurality of data items, to each accelerator for processing, thereby enabling high-rate execution of a plurality of types of data processing.

In this type of system, when a plurality of data items that are received by a receiving device are transferred in parallel to a plurality of accelerators via a switch, a data transfer volume per hour from the receiving device to the switch may exceed a bandwidth between the receiving device and the switch. When the data transfer volume per hour exceeds the bandwidth between the receiving device and the switch, it may be difficult to perform normal data processing by each accelerator because data lacking information is transferred to each accelerator.

SUMMARY

Accordingly, it is an object in one aspect of the embodiments to transfer normal data to each of a plurality of second devices without exceeding a bandwidth between a first device and a switch, even when an hourly transfer volume of data transferred from the first device to the second devices is high.

According to one aspect of the embodiments, a data transfer controller for controlling transfer of a plurality of data items from a first device to a plurality of second devices includes a processor configured to:

when the data transfer controller is mounted on an information processing device including the first device configured to receive the plurality of data items, the plurality of second devices configured to receive and process the plurality of data items that are transmitted in parallel from the first device, at least one first memory configured to store one or more of the plurality of data items, and a switch configured to interconnect the first device, the plurality of second devices, and the at least one first memory, transfer at least one data item of the plurality of data items that is to be transferred from the first device to the plurality of second devices, to the at least one first memory, upon occurrence of a condition in which an hourly transfer volume of the plurality of data items transferred from the first device to the switch exceeds a bandwidth between the first device and the switch. The processor is configured to cause the plurality of second devices to acquire the at least one data item that is stored in the at least one first memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of various tables provided in a transfer control unit in FIG. 4;

FIG. 7 is a diagram illustrating an example of various tables provided in the transfer control unit to resolve a problem illustrated in FIG. 4;

FIG. 10 is a diagram illustrating an example of calculating a latency until stream data 2 arrives from an FPGA to GPUs 1 to 3 along data transfer paths illustrated in FIG. 8;

FIG. 11 is a diagram illustrating an example of various tables provided in the transfer control unit to resolve the problem of not satisfying a latency requirement;

FIG. 13 is a diagram illustrating an example of setting various tables in the transfer control unit along a transfer path of stream data illustrated in FIG. 12;

FIG. 14 is a diagram illustrating an example of calculating the latency until the stream data 2 arrives from the FPGA to the GPUs 1 to 3 along the data transfer path illustrated in FIG. 12.

DESCRIPTION OF EMBODIMENTS

Embodiments of the present invention will be described with reference to the accompanying drawings.

Figure 1:
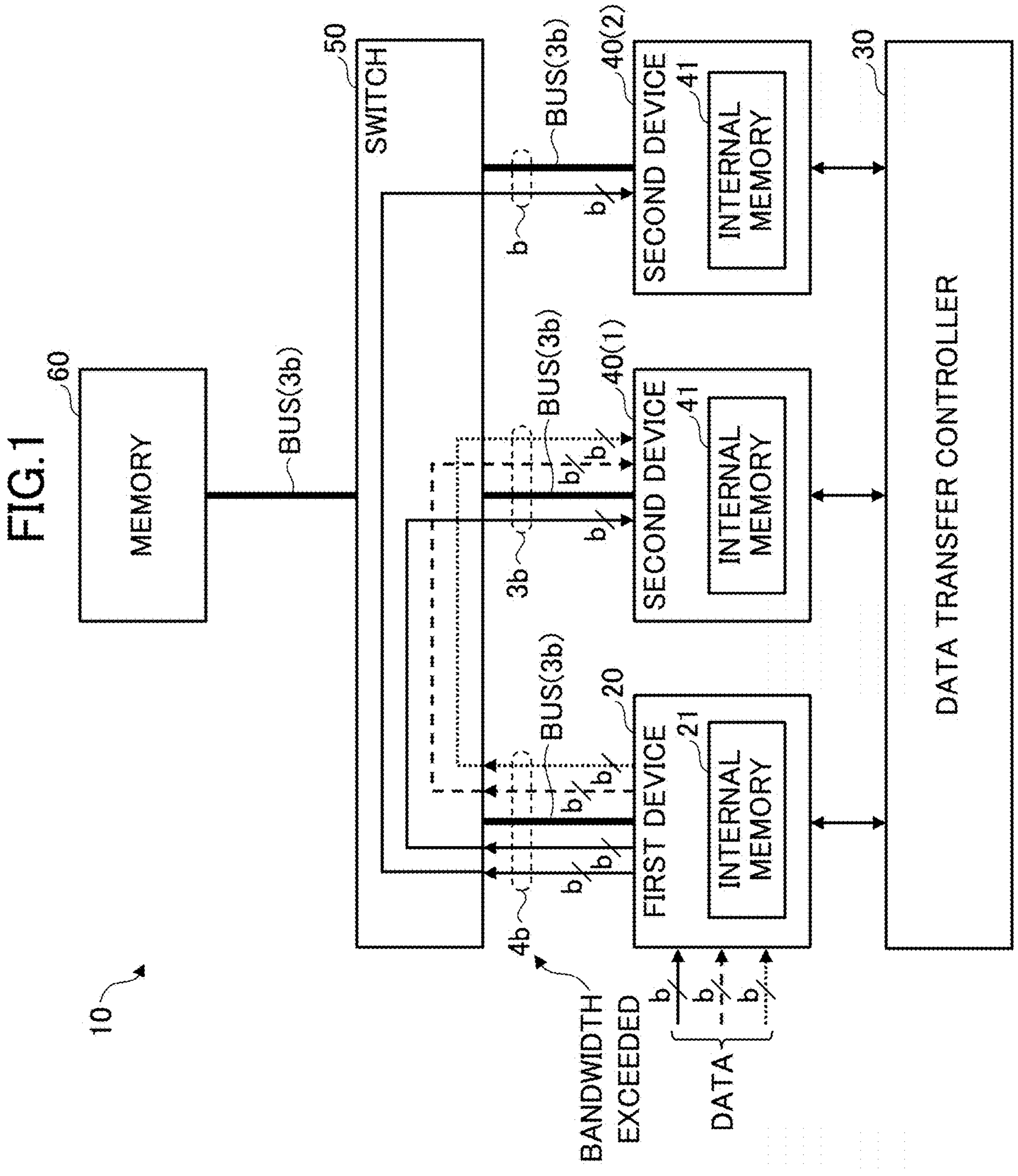
FIG. 1 is a block diagram illustrating an example of an information processing device according to one embodiment.

FIG. 1 illustrates an example of an information processing device according to one embodiment. An information processing device 10 illustrated in FIG. 1 includes: a first device 20 including an internal memory 21; a data transfer controller 30; a plurality of second devices 40 each of which includes an internal memory 41; a switch 50; and a memory 60. Each of the first device 20, the second devices 40, and the memory 60 is connected to the switch 50 via a bus BUS. The switch 50 can transfer data among the first device 20, the second devices 40, and the memory 60 that are connected to respective buses BUS. The bandwidth of each bus BUS is assumed to be 3b [MB/s].

The information processing device 10 repeatedly receives a plurality of data (which may be referred to as a plurality of data items) in parallel from an external source, and each of the second devices sequentially acquires a predetermined number of data items, and processes the data. In order to perform data processing by the second devices without failure, data transfer from the first device 20 to each second device 40 is performed at a rate that is equal to or higher than a receiving rate of data that is received from the external source. For example, it is assumed that a transfer rate b [MB/s] of each data that is transferred from the first device 20 to each second device 40 is the same as the receiving rate b [MB/s] of the data that is received by the first device 20. Although not particularly limited, the data received from the external source may be stream data such as video data.

The data transfer controller 30 controls the transfer paths of a plurality of data that are transferred from the first device 20 to the second devices 40. The data transfer paths may include a memory 60. In this case, any data is transferred from the first device 20 to the second device 40 via the switch 50 and the memory 60. The data transfer controller 30 may have a table in which each data transfer rate; information indicating each of the second devices 40 that process data; address information of a storage area that holds each data in the internal memory 21; and information indicating the bandwidth of each bus BUS are held. The data transfer controller 30 may be provided in the first device 20. In this case, information that is held by the data transfer controller 30 is accessible from the second device 40.

The first device 20 stores three data that are received in parallel from outside of the information processing device 10, in the internal memory 21. According to the information held in the table in the data transfer controller 30, each second device 40 transfers data to be processed, among the three data held in the internal memory 21, from the internal memory 21 to the internal memory 41 of the second device 40 via the switch 50. In the example illustrated in FIG. 1, a second device 40(1) reads and processes the three data from the internal memory 21, and a second device 40(2) reads and processes one data from the internal memory 21. The second devices 40 sequentially outputs the processed data. Hereinafter, reference numerals 40(1) and 40(2) may collectively be referred to as reference numeral 40.

FIG. 1 illustrates an example of transferring three data from the first device 20 to one or more second devices 40 without using the memory 60. Data items that are indicated by solid lines and are processed by both the second devices 40(1) and 40(2) are indicated using two transfer paths. Two data items that are indicated by two types of dashed lines and are processed by only the second device 40(1) are indicated by respective transfer paths. In this case, a data transfer volume per hour from the first device 20 to the switch 50 is set to 4b [MB/s], and data cannot be transferred via the bus BUS having a bandwidth of 3b [MB/s].

Figure 2:
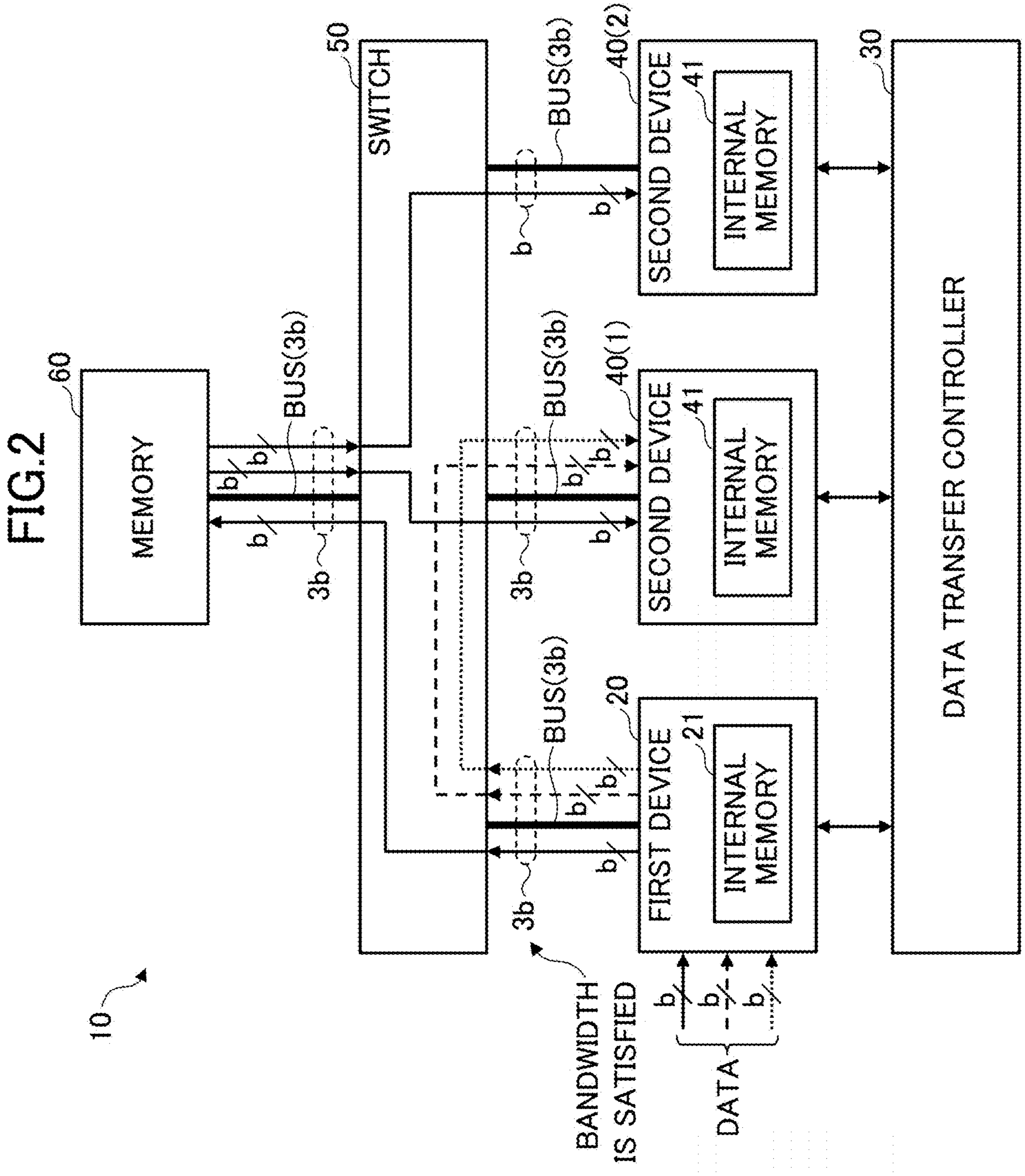
FIG. 2 is a diagram illustrating an operational example of transferring data without exceeding a bandwidth of a bus in the information processing device according to FIG. 1.

FIG. 2 illustrates an operational example in which data is transferred without exceeding the bandwidth of the bus BUS in the information processing device 10 illustrated in FIG. 1. In the example illustrated in FIG. 2, data items indicated by solid lines are transferred to the second devices 40(1) and 40(2) via the memory 60. In this case, an hourly transfer volume of the data transferred from the first device 20 to the switch 50 is set to 3b [MB/s], which can be maintained within the bandwidth of 3b [MB/s] or less for the bus BUS.

A data item indicated by one solid line is written to the memory 60. Data items indicated by two solid lines are read from the memory 60 and transferred to the second devices 40(1) and 40(2) via the switch 50. In this arrangement, an hourly transfer volume of data that is read from or written to the memory 60 is set to 3b [MB/s], which can be maintained within the bandwidth of 3b [MB/s] or less for the bus BUS.

The hourly transfer volume of the data transferred to each of the second devices 40(1) and 40(2) is the same as that illustrated in FIG. 1, and the hourly transfer volume can be maintained within the bandwidth of 3b [MB/s] or less for the bus BUS. As a result, the data can be transferred from the first device 20 to each of the second devices 40(1) and 40(2) without exceeding the bandwidth of the bus BUS. In this arrangement, the second devices 40(1) and 40(2) can receive and process data normally without any omissions, and thus the information processing device 10 can operate normally.

As described above, in the present embodiment, data can be transferred from the first device 20 to each of the second devices 40 without exceeding the bandwidth of the bus BUS that connects the first device 20 and the switch 50. In other words, even when the number of parallel data items transferred from the first device 20 to the switch 50 is reduced in order to suppress exceeding the bandwidth, a predetermined number of data items can be transferred to a plurality of second devices 40 without any omissions. In this arrangement, each of the second devices 40 can receive and process data normally without any omissions, and the information processing device 10 can operate normally.

Figure 3:
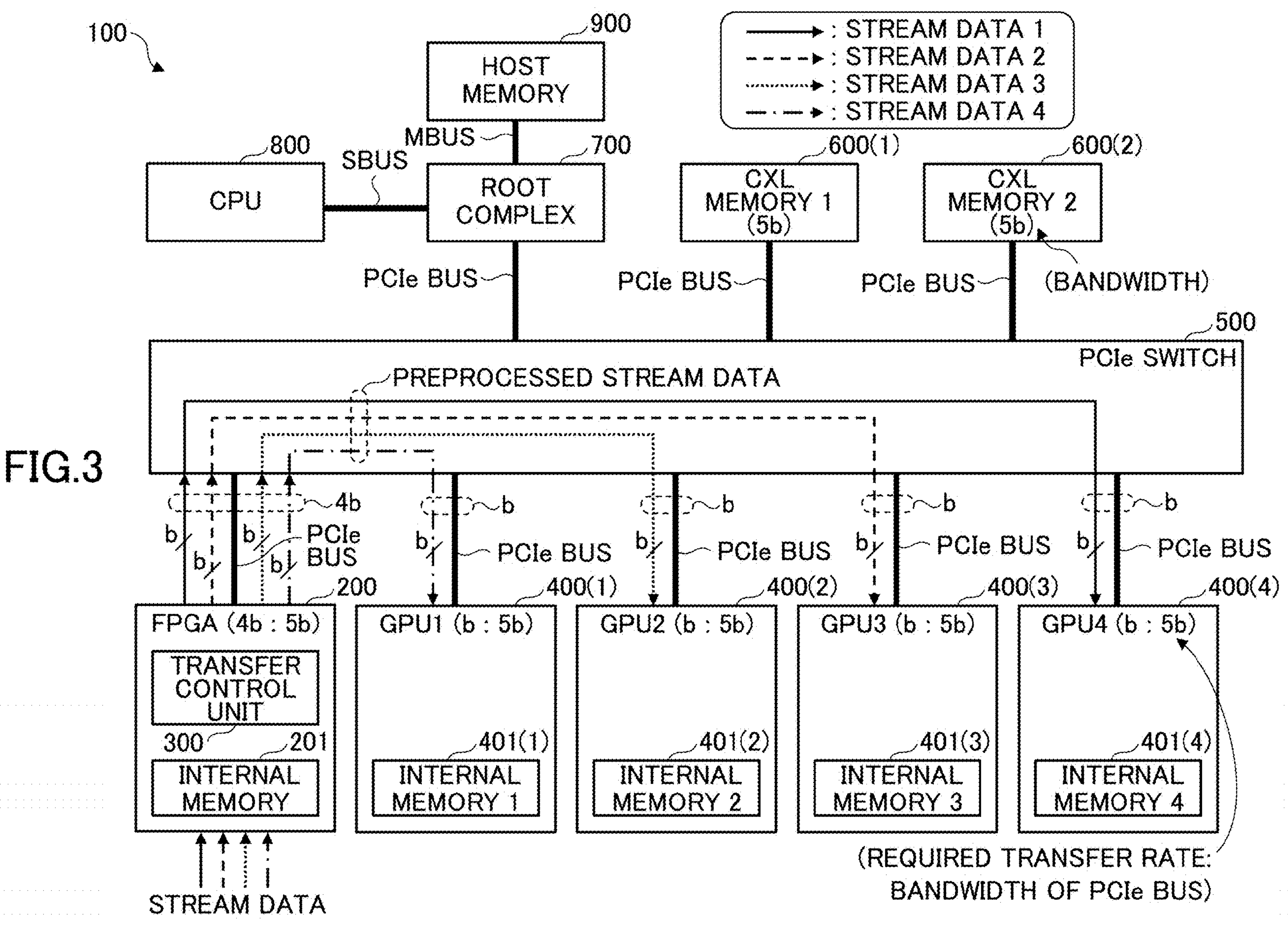
FIG. 3 is a block diagram illustrating an example of the information processing device according to another embodiment.

FIG. 3 illustrates an example of the information processing device according to another embodiment. An information processing device 100 illustrated in FIG. 3 includes a field-programmable gate array (FPGA) 200, a plurality of graphics processing units (GPUs) 400, and a PCIe (Peripheral Component Interconnect express) switch 500. The information processing device 100 has a plurality of CXL (Compute Express Link) memories 600, a root complex 700, a CPU (Central Processing Unit) 800, and a host memory 900.

The FPGA 200 is an example of the first device, and each GPU 400 is an example of the second device. Each CXL memory 600 is an example of a first memory. Although the information processing device 100 transfers data such as stream data, by using a PCIe interface, the information processing device 100 may transfer data, using other interfaces. Instead of the CXL memory 600, a memory of other standards may be installed in the information processing device 100.

The FPGA 200, GPUs 400(1), 400(2), 400(3), and 400(4), CXL memories 600(1) and 600(2), and the root complex 700 are connected to the PCIe switch 500 by respective PCIe buses, and can communicate with one another. Hereinafter, the GPUs 400(1), 400(2), 400(3), and 400(4) are referred to as a GPU 1, a GPU 2, a GPU 3, and a GPU 4, respectively. The CXL memories 600(1) and 600(2) are referred to as a CXL memory 1 and a CXL memory 2, respectively. For explanation purposes, it is assumed that all PCIe buses are assumed to have the same bandwidth B [MB/s]. For example, each PCIe bus uses an ×16 slot. Hereinafter, reference numerals 400(1) to 400(4) may collectively be referred to as reference numeral 400, and reference numerals 600(1) and 600(2) may collectively be referred to as reference numeral 600.

The host memory 900 is connected to the root complex 700 via a memory bus MBUS. A CPU 800 is connected to the root complex 700 via a system bus SBUS and controls the entire information processing device 100. For example, a control program of the information processing device 100 that is executed by the CPU 800 may be stored in the host memory 900.

The FPGA 200 includes an internal memory 201 having a bandwidth equal to or greater than that of the PCIe bus, and includes a transfer control unit 300. The transfer control unit 300 is an example of the data transfer controller. The transfer control unit 300 may be provided outside the FPGA 200 and in the information processing device 100.

GPUs 1 to 4 include respective internal memories 401(1), 401(2), 401(3), and 401(4) each of which has a bandwidth equal to or greater than the bandwidth of the PCIe bus. In this arrangement, processing performance of the information processing device 100 is not limited by data transfer rates for input/output to and from the internal memories 201, 401(1), 401(2), 401(3), and 401(4). The internal memories 401(1), 401(2), 401(3), and 401(4) are examples of a second memory. Hereinafter, the internal memories 401(1), 401(2), 401(3), and 401(4) are referred to as internal memories 1, 2, 3, and 4, respectively.

The FPGA 200 receives four stream data 1 to 4 in parallel from the outside of the information processing device 100. For example, each of the stream data 1 to 4 is video data from one monitor camera. The video data includes multiple event data items such as consecutive frames. The number of stream data received in parallel by the FPGA 200 is not limited to four, as long as a total receiving rate is equal to or less than the bandwidth of the PCIe bus.

The FPGA 200 preprocesses the received stream data 1 to 4, and generates the preprocessed stream data 1 to 4. For example, the preprocessing includes decoding, filtering, or resizing of the stream data 1 to 4. The FPGA 200 stores the preprocessed stream data 1 to 4 in a predetermined memory such as the internal memory 201. A destination memory in which each of the stream data 1 to 4 is stored includes any one of the internal memory 201, the host memory 900, the internal memories 1 to 4, and the CXL memories 1 and 2, and the destination memory is specified by the transfer control unit 300.

For explanation purposes, it is assumed that both a receiving rate of each of the stream data 1 to 4 received by the FPGA 200 and a generation rate of each of the stream data 1 to 4 generated by the FPGA 200 are identical and are b [MB/s]. It is also assumed that the transfer rate of each of the stream data 1 to 4 on the PCIe bus is b [MB/s], which is the same as the generation rate of each of the stream data 1 to 4.

It is assumed that each PCIe bus can transfer a maximum of five stream data in parallel. In this arrangement, when the bandwidth of each PCIe bus is B [MB/s], the transfer rate of one stream data is 0.2B [MB/s]. In other words, the bandwidth of each PCIe bus is 5b [MB/s]. In the following description, the bandwidth of each PCIe bus is 5b [MB/s].

Each of the GPUs 1 to 4 operates, for example, as an accelerator controlled by the CPU 800. Each of the GPUs 1 to 4 reads, from the storage memory, a predetermined number of stream data, among the stream data that are generated through preprocessing by the FPGA 200, and then performs data processing such as inference processing by AI. For example, when the stream data 1 to 4 are video data, inference processing includes image recognition. The data resulting from the data processing by each of the GPUs 1 to 4 is transferred to the CPU 800, for example.

The GPUs 1 to 4 have an ability to process the stream data 1 to 4 that are preprocessed by the FPGA 200 at a rate that is equal to or higher than the generation rate (bMB/s) of the stream data 1 to 4 obtained by the FPGA 200.

The size of result data processed by each of the GPUs 1 to 4 is significantly smaller than the size of the stream data 1 to 4. For example, a transfer rate of the result data transferred from each of the GPUs 1 to 4 to the CPU 800 is 1/100 or less of the generation rate of each of the stream data 1 to 4 obtained by the FPGA 200. In this arrangement, in the following description, it is assumed that the transfer of the result data transferred from each of the GPU 1 to the GPU 4 to the CPU 800 does not affect the transfer of the stream data 1 to 4 processed by the GPUs 1 to 4. For example, the bandwidth of each PCIe bus is actually B [MB/s]+$\alpha$, and $\alpha$ is used for the transfer of the result data transferred from each of the GPUs 1 to 4 to the CPU 800.

The CXL memories 1 and 2 can temporarily hold the stream data processed by the GPUs 1 to 4. It is assumed that a data input/output rate (bandwidth) of each of the CXL memories 1 and 2 is equal to or greater than the bandwidth of the PCIe bus, and is 5b [MB/s] in the example illustrated in FIG. 3.

In the example illustrated in FIG. 3, the FPGA 200 preprocesses each of the stream data 1 to 4 that is received from the outside of the information processing device 100, and then stores the data stream in the internal memory 201 in the FPGA 200. The GPUs 1 to 4 read and process one of the stream data 1 to 4 from the internal memory 201 in parallel. In this case, four stream data 1 to 4 are transferred in parallel from the FPGA 200 (internal memory 201) to the PCIe switch 500.

In this arrangement, an hourly transfer volume of the stream data 1 to 4 for PCIe buses between the FPGA 200 and the PCIe switch 500 is set to 4b [MB/s], which is lower than the bandwidth of the PCIe bus (5b [MB/s]). In this case, the stream data 1 to 4 are transferred from the FPGA 200 to the PCIe switch 500 without data loss.

Also, one of the four stream data 1 to 4 is transferred from the PCIe switch 500 to a corresponding GPU among the GPUs 1 to 4. In this arrangement, the hourly transfer volume of the stream data on the PCIe bus between the PCIe switch 500 and each of the GPUs 1 to 4 is b [MB/s], which is lower than the bandwidth of the PCIe bus.

In this arrangement, in FIG. 3, each of the GPUs 1 to 4 can perform data processing such as inference processing, without causing data loss such as missing frames of the stream data 1 to 4 that are preprocessed in parallel by the FPGA 200. As a result, each of the GPUs 1 to 4 can transfer normal result data of data processing to the CPU 800, and thus the information processing device 100 can operate normally.

Figure 4:
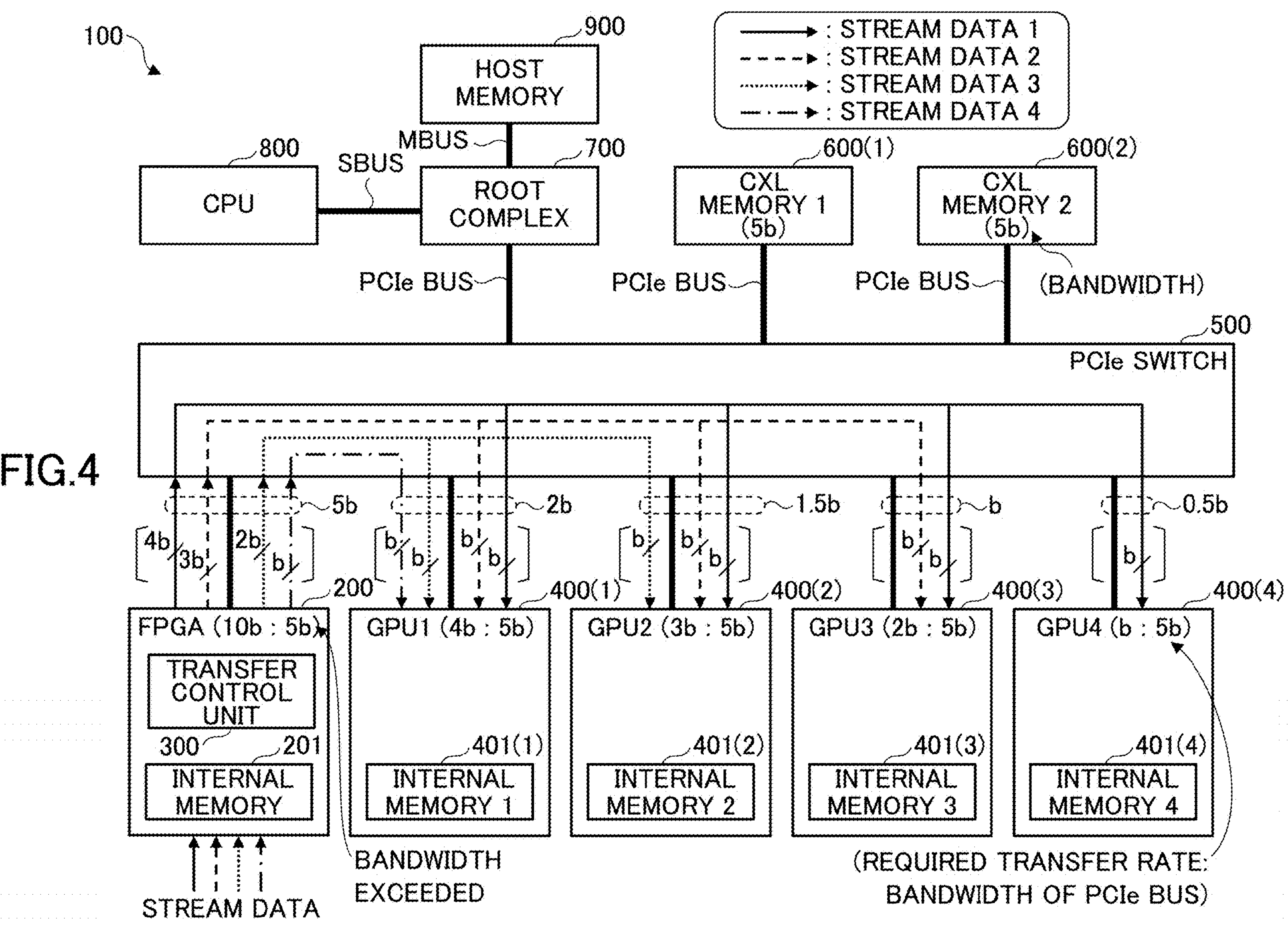
FIG. 4 is a diagram for describing an example in which stream data is not transferred normally in the information processing device in FIG. 3.

FIG. 4 illustrates an example in which stream data 1 to 4 are not normally transferred in the information processing device 100 of FIG. 3. In FIG. 4, the FPGA 200 preprocesses four stream data 1 to 4 received from the outside of the information processing device 100, and then stores the stream data 1 to 4 in the internal memory 201 in the FPGA 200. The GPU 1 reads the four stream data 1 to 4 from the internal memory 201, and processes the stream data 1 to 4. The GPU 2 reads three stream data 1 to 3 from the internal memory 201, and processes the stream data 1 to 3. The GPU 3 reads two stream data 1 and 2 from the internal memory 201, and processes the stream data 1 and 2. The GPU 4 reads one stream data 1 from the internal memory 201, and processes the stream data 1.

In this case, ten stream data are transferred in parallel from the FPGA 200 (internal memory 201) to the PCIe switch 500. In this arrangement, an hourly transfer volume (performance requirements) of the stream data required on the PCIe bus between the FPGA 200 and the PCIe switch 500 is set to 10b [MB/s], which is twice the bandwidth of the PCIe bus (5b [MB/s]). The performance requirements for hourly transfer volumes of the stream data 1 to 4 are indicated in brackets for the PCIe buses that are each connected to the FPGA 200. In the following, the hour transfer volume is also referred to as a transfer rate.

In practice, the transfer rate of each of stream data 1 to 4 transferred from the FPGA 200 to the PCIe switch 500 is limited by the bandwidth of the PCIe bus, and thus is half the performance requirements. In this arrangement, a total transfer rate of ten stream data is set to 5b [MB/s], which is equal to the bandwidth of the PCIe bus. Also, the total transfer rate of the ten stream data from the PCIe switch 500 to the GPUs 1 to 4 is set to be equal to an actual transfer rate of the ten stream data that are transferred from the FPGA 200 to the PCIe switch 500.

In this arrangement, the transfer rate of four stream data 1 to 4 transferred from the PCIe switch 500 to the GPU 1 is set to 2b [MB/s]. The transfer rate of three stream data 1 to 3 transferred from the PCIe switch 500 to the GPU 2 is set to 1.5b [MB/s]. The transfer rate of two stream data 1 and 2 transferred from the PCIe switch 500 to the GPU 3 is set to b [MB/s]. The transfer rate of one stream data 1 transferred from the PCIe switch 500 to the GPU 4 is set to 0.5b [MB/s]. In this case, each of the GPUs 1 to 4 processes stream data with half of data dropped, and as a result, the GPU may be unable to perform normal data processing.

FIG. 5 illustrates an example of various tables provided in the transfer control unit 300 of FIG. 4. The transfer control unit 300 has a data amount management table 301 for stream data, a transfer destination management table 302, an area management table 303, and a memory management table 304. FIG. 5 illustrates an initial state of each table that is set by the transfer control unit 300.

The data amount management table 301 has an entry for holding a flow rate indicating a generation rate of each of stream data 1 to 4 that is generated by the FPGA 200 through preprocessing. In the example of FIG. 5, the flow rate of each of the stream data 1 to 4 is b [MB/s]. The transfer control unit 300 adds or deletes an entry in the data amount management table 301, when adding or deleting stream data received from the outside of the information processing device 100.

The transfer destination management table 302 has, for each of stream data 1 to 4, an entry for holding information identifying one or more GPUs that use stream data. In the example of FIG. 5, the stream data 1 is used by GPUs 1 to 4, and the stream data 2 is used by GPUs 1 to 3. The stream data 3 is used by GPUs 1 and 2, and the stream data 4 is used by the GPU 1.

The transfer control unit 300 adds or deletes an entry in the transfer destination management table 302, when adding or deleting stream data that is received from the outside of the information processing device 100. Also, the transfer control unit 300 updates a corresponding entry in the transfer destination management table 302, when adding or deleting GPU workloads that use each stream data.

Figure 6:
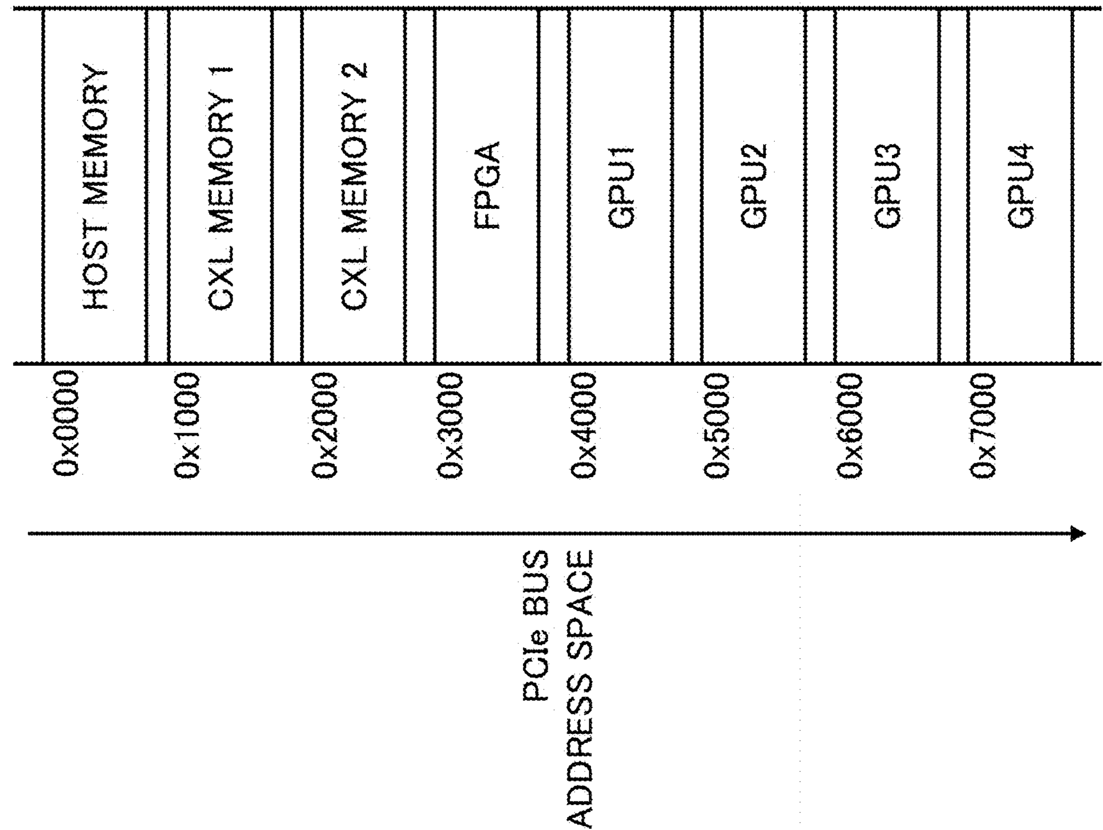
FIG. 6 is a diagram illustrating an example of an address space of a PCIe bus in the information processing device illustrated in FIG. 3.

The area management table 303 has, for each of the stream data 1 to 4, an entry for holding (i) information indicating a storage destination device of the stream data that is generated by the FPGA 200 through preprocessing, and (ii) information indicating a PCIe bus address space of a storage destination. A memory of each of various devices that is connected to the PCIe bus is allocated to a PCIe bus address space. An example of the PCIe bus address space is illustrated in FIG. 6. The area management table 303 is set by the transfer control unit 300, copied by each of the GPUs 1 to 4, and held in each of the GPUs 1 to 4.

In the example illustrated in FIG. 4, the size of each of the stream data 1 to 4 preprocessed by the FPGA 200 is 0x100. The preprocessed stream data 1 is stored in an address apace 0x3000-0x30FF of the internal memory 201 of the FPGA 200. The preprocessed stream data 2 is stored in an address space 0x3100-0x31FF of the internal memory 201 of the FPGA 200. The preprocessed stream data 3 is stored in an address space 0x3200-0x32FF of the internal memory 201 of the FPGA 200. The preprocessed stream data 4 is stored in an address space 0x3300-0x33FF of the internal memory 201 of the FPGA 200.

The transfer control unit 300 adds or deletes an entry in the area management table 303, when adding or deleting stream data that is received from the outside of the information processing device 100. When changing the memory of a given device for storing each stream data, the transfer control unit 300 updates a corresponding entry in the area management table 303.

For each memory, the memory management table 304 has entries for holding an available space of a memory, an available bandwidth (upstream) of a data transfer path from the PCIe switch 500 to the memory, and an available bandwidth (downstream) of the data transfer path from the memory to the PCIe switch 500. In the example of FIG. 4, the host memory 900 and the CXL memories 1 and 2 are not used for transferring each stream data, and in this case, for each of the host memory 900 and the CXL memories 1 and 2, the available bandwidth for each of upstream and downstream is set to B [MB/s], which is equal to the bandwidth of the PCIe bus. When changing a memory for storing stream data, the transfer control unit 300 updates the available space and available bandwidths (for upstream and downstream) of a target memory in which stream data is to be stored.

FIG. 6 illustrates an example of the PCIe bus address space in the information processing device 100 of FIG. 3. Memory spaces of the host memory 900, the CXL memories 1 and 2, the FPGA 200, and the GPUs 1 to 4 are allocated to the PCIe bus address space. The address space allocation illustrated in FIG. 6 is an example, and addresses allocated to each device are not limited to the example illustrated in FIG. 6.

FIG. 7 illustrates an example of various tables provided in the transfer control unit 300 for resolving the problem illustrated in FIG. 4. The data amount management table 301 and the transfer destination management table 302 are the same as those illustrated in FIG. 5. In order to resolve the problem illustrated in FIG. 4, the transfer control unit 300 determines that the FPGA 200 stores the preprocessed stream data 1 in the CXL memory 1, and stores the preprocessed stream data 2 in the CXL memory 2.

In this arrangement, for the area management table 303, the transfer control unit 300 stores both information indicating the CXL memory 1 and information indicating the address space 0x0000-0x00FF, in an entry for the stream data 1. For the area management table 303, the transfer control unit 300 stores both information indicating the CXL memory 2 and information indicating the address space 0x1000-0x01FF, in an entry for the stream data 2. The preprocessed stream data 3 and 4 are stored in the internal memory 201 of the FPGA 200, and entries for the stream data 3 and 4 in the area management table 303 are maintained in the state illustrated in FIG. 5.

Also, in accordance with an updated area management table 303, the transfer control unit 300 changes the available space and available bandwidths for upstream and downstream, in the entry of the CXL memory 1 in the memory management table 304. Also, in accordance with the updated area management table 303, the FPGA 200 changes the available space and available bandwidths for uplink and downlink, in the entry of the CXL memory 2 in the memory management table 304. Changes in the available bandwidths will be described with reference to FIG. 8.

Figure 8:
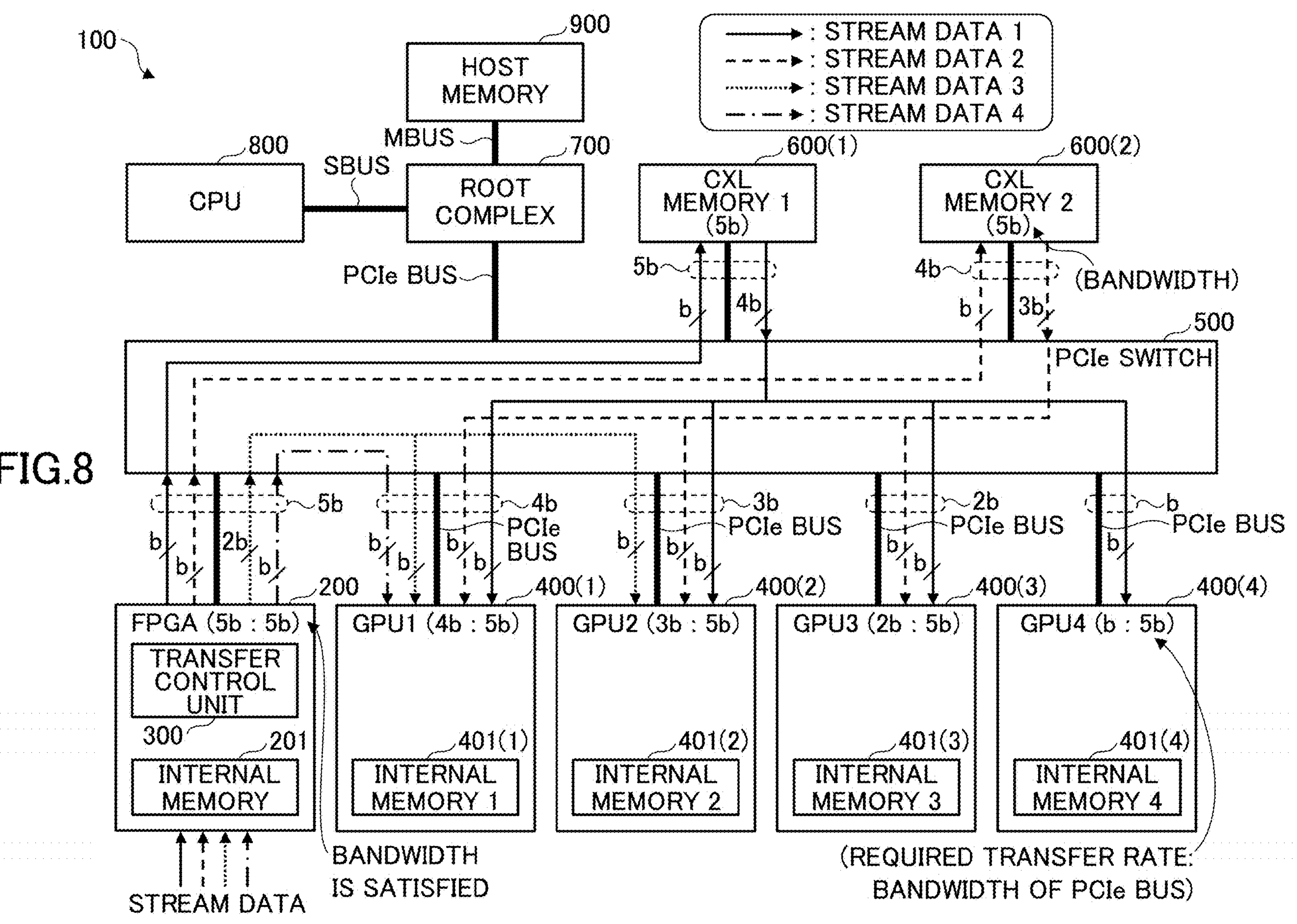
FIG. 8 is a diagram illustrating an operational example of resolving the problem illustrated in FIG. 4 in the information processing device illustrated in FIG. 3.

FIG. 8 illustrates an operation example of resolving the problem illustrated in FIG. 4 in the information processing device 100 in FIG. 3. The operation that is similar to that illustrated in FIG. 4 will not be described in detail. The operation illustrated in FIG. 8 is performed using the FPGA 200 and the GPUs 1 to 4, based on information of various tables illustrated in FIG. 7 that are set by the transfer control unit 300.

The FPGA 200 stores the preprocessed stream data 1 in the CXL memory 1, and stores the preprocessed stream data 2 in the CXL memory 2. Each of the GPUs 1 to 4 reads the stream data 1 from the CXL memory 1. Each of the GPUs 1 to 3 reads the stream data 2 from the CXL memory 2.

The GPUs 1 to 4 do not read the stream data 1 from the internal memory 201 of the FPGA 200, and only one CXL memory 1 is used to send the stream data 1 from the FPGA 200. Similarly, the GPUs 1 to 3 do not read the stream data 2 from the internal memory 201 of the FPGA 200, and only one CXL memory 2 is used to send the stream data 2 from the FPGA 200. As a result, the sum of performance requirements of PCIe buses between the FPGA 200 and the PCIe switch 500 is set to 5b [MB/s], which is equal to the bandwidth of the PCIe bus, and the bandwidth of the PCIe bus can be satisfied.

The CXL memory 1 receives one stream data 1, and respectively sends four stream data 1 to GPUs 1 to 4 in response to transfer requests from the GPUs 1 to 4. In this arrangement, the sum of the performance requirements of PCIe buses between the CXL memory 1 and the PCIe switch 500 is set to 5b [MB/s], which is equal to the bandwidth of the PCIe bus.

The CXL memory 2 receives one stream data 2, and respectively sends three stream data 2 to GPUs 1 to 3 in response to transfer requests from the GPUs 1 to 3. In this arrangement, the sum of the performance requirements of PCIe buses between the CXL memory 2 and the PCIe switch 500 is set to 4b [MB/s], which is less than the bandwidth of the PCIe bus (5b [MB/s]).

Each of the GPUs 1 to 4 receives a maximum of four stream data through the PCIe switch 500. In this arrangement, the sum of the performance requirements of the PCIe buses between the PCIe switch 500 and the GPUs 1 to 4 is set to 4b [MB/s] or less, which is less than the bandwidth (5b [MB/s]) of the PCIe bus.

In this arrangement, each of the GPUs 1 to 4 receives stream data without causing data loss such as missing frames of the stream data that are preprocessed in parallel by the FPGA 200, and can perform data processing such as inference processing. As a result, each of the GPUs 1 to 4 can transfer normal result data of the data processing to the CPU 800, and the information processing device 100 can operate normally.

Figure 9:
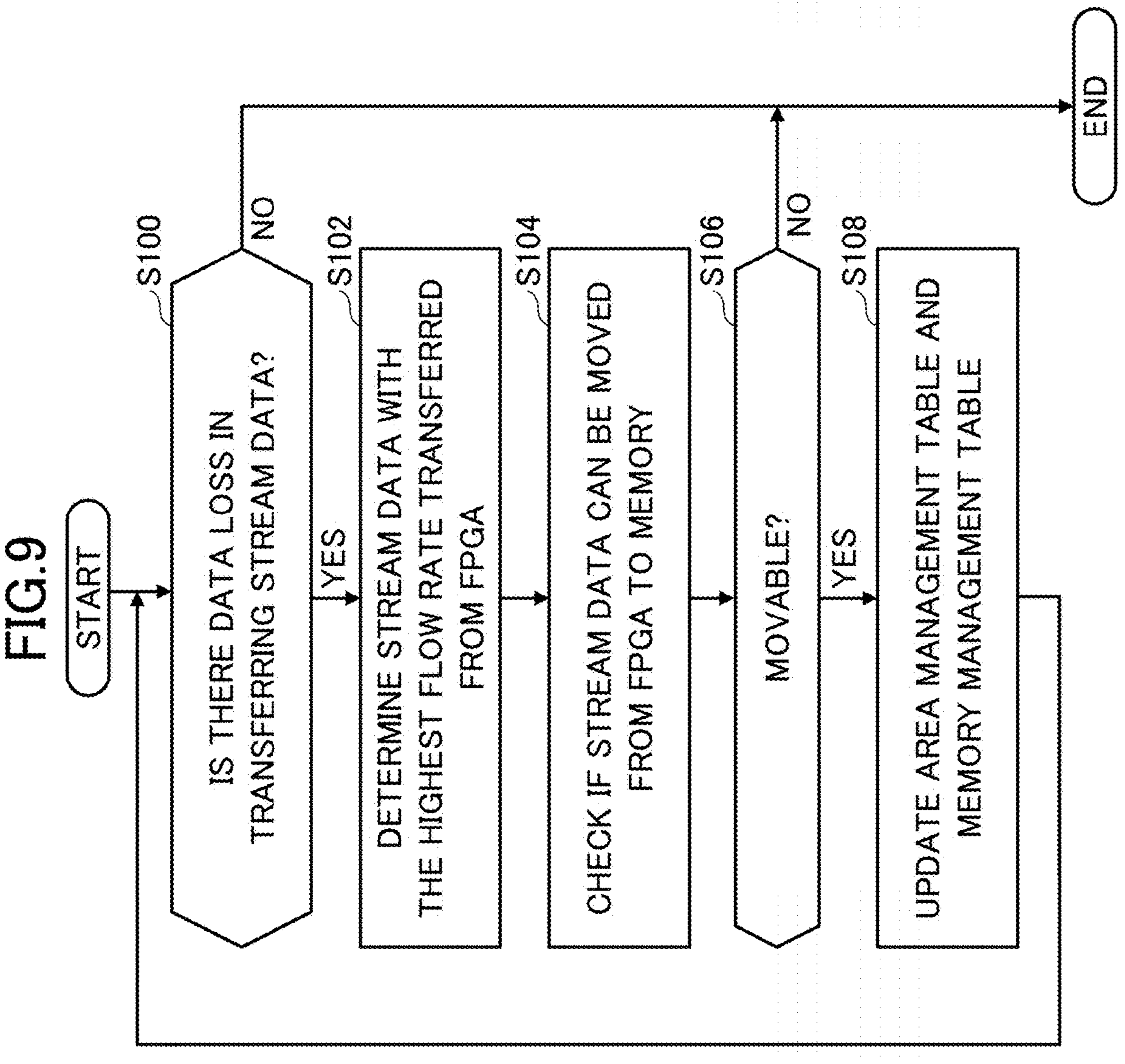
FIG. 9 is a flow diagram illustrating an operational example of determining a transfer path of stream data illustrated in FIG. 8.

FIG. 9 illustrates an operational flow example of determining the transfer path of the stream data illustrated in FIG. 8. The operation illustrated in FIG. 9 is performed by the transfer control unit 300 when stream data is added and deleted, when GPU workloads using each stream data are added and deleted, and when a CXL memory is added and deleted.

First, in step S100, the transfer control unit 300 determines whether data loss will occur in transferring the stream data from the FPGA 200 to the GPU 400. That is, the transfer control unit 300 determines whether an hourly transfer volume of the stream data transferred from the FPGA 200 to the PCIe switch 500 is greater than the bandwidth of the PCIe bus. If data loss occurs, the transfer control unit 300 performs step S102 because the GPU 400 is unable to perform normal data processing. If data loss does not occur, the transfer control unit 300 terminates the operation illustrated in FIG. 9 because the GPU 400 can perform the normal data processing.

In step S102, the transfer control unit 300 refers to the data amount management table 301 and the transfer destination management table 302. Then, the transfer control unit 300 determines stream data, having a maximum flow rate (that is, the hourly transfer volume), to be transferred to a given GPU 400, among the stream data held in the internal memory 201. By referring to the data amount management table 301 and the transfer destination management table 302, the transfer control unit 300 can determine the stream data having the maximum flow rate, by a simple calculation.

Here, the transfer control unit 300 calculates the transfer flow rate by Equation (1) below. The flow rate of the stream data transferred to one GPU 400 is calculated as the product of the number of transfers per unit time and the size of the stream data.

(Flow rate of stream data transferred to one GPU 400)×(The number of GPUs 400 that receive the stream data). (1)

Next, in step S104, the transfer control unit 300 refers to the data amount management table 301, the transfer destination management table 302, and the memory management table 304. Then, the transfer control unit 300 checks whether the stream data determined in step S102 can be moved from the FPGA 200 to a memory outside the FPGA 200. Memories to be checked include the CXL memories 1 and 2 and the host memory 900. Here, the "can be moved" means that a memory to which the stream data is to be moved has an available space where the stream data is stored, and that the performance requirements (bandwidths) of all GPUs 400 that use the stream data moved to the memory are satisfied.

Next, in step S106, if there is a memory to which the stream data can be moved based on a processing result in step S104, the transfer control unit 300 performs step S108. If there is no memory to which the stream data can be moved, the transfer control unit 300 terminates the operation illustrated in FIG. 9. In this case, by distributing and processing multiple stream data through a plurality of information processing devices 100, data loss is prevented in transferring the stream data from the FPGA 200 to the GPUs 400.

When there are a plurality of memories to which stream data can be moved, the transfer control unit 300 selects one of the plurality of memories based on a preset criterion. For example, the transfer control unit 300 selects a memory having the largest available capacity. When the available capacities of the CXL memories 1 and 2 and the host memory are given as $C_{CM1}>C_{CM2}>C_{HM}$, the transfer control unit 300 selects the CXL memory 1 as a storage destination for the stream data. By selecting the memory in order from the memory having the largest available capacity, variations in the available capacities of the memories, to which data is transferred, can be suppressed.

Next, in step S108, the transfer control unit 300 updates the area management table 303 with information indicating the memory selected in step S104. In addition, in the memory management table 304, the transfer control unit 300 updates the available capacity of the memory to which the stream data is to be transferred; and available bandwidths for upstream and downstream, and returns to step S100. By determining the memory to which stream data is moved in order from the stream data having the largest flow rate, the number of loops in the operation of FIG. 9 can be reduced, and quick convergence to a state in which no data loss occurs is enabled.

Here, in FIG. 8 above, for example, the stream data 2 is transferred from the FPGA 200 to the CXL memory 2, and then is read from the CXL memory 2 by the GPUs 1 to 3 for processing. When the stream data 2 is transferred to the CXL memory 2, a transfer time of the stream data from the FPGA 200 to the GPUs 1 to 3 becomes longer, compared to the operation illustrated in FIG. 4.

If a transfer latency of the stream data from the FPGA 200 to the GPU 400 does not satisfy a processing latency required by processing of the GPU 400, it becomes difficult for the GPU 400 to perform normal processing. Hereinafter, a solution will be described for a case where the transfer latency of the stream data 2 transferred via the CXL memory 2 of FIG. 8 does not satisfy the processing latency of the GPU 3.

FIG. 10 illustrates an example of calculating the latency until the stream data 2 arrives from the FPGA 200 to the GPUs 1 to 3 along the data transfer path of FIG. 8. For explanation purposes, it is assumed that a data size of one event, such as a frame, in each stream data is b [MB]. A transfer rate of each stream data is b [MB/s], and in this case, the event is generated every one second. The bandwidth of the PCIe bus is B [MB/s] (=5b [MB/s]). In the following, the bandwidth of the PCIe bus used for transferring stream data is expressed using the number of stream data.

For the transfer path of the stream data 2 from the FPGA 200 to the CXL memory 2, five stream data are transferred from the FPGA 200 to the PCIe switch 500, and one stream data is transferred from the PCIe switch 500 to the CXL memory 2. In this arrangement, the bandwidth for each stream data from the FPGA 200 to the PCIe switch 500 is B/5, and the bandwidth for each stream data from the PCIe switch 500 to the CXL memory 2 is B/1. A worst-case latency of the stream data 2 from the FPGA 200 to the CXL memory 2 is calculated as b/(B/5)=5*b/B, using B/5, which has a low bandwidth and a large impact on latency (where the sign * is a multiplication sign).

For the transfer path of the stream data 2 from the CXL memory 2 to the GPU 3, three stream data are transferred from the CXL memory 2 to the PCIe switch 500, and two stream data are transferred from the PCIe switch 500 to the GPU 3. In this arrangement, the bandwidth for each stream data from the CXL memory 2 to the PCIe switch 500 is B/3, and the bandwidth for each stream data from the PCIe switch 500 to the GPU 3 is B/2.

A worst-case latency of the stream data 2 from the CXL memory 2 to the GPU 3 is calculated as b/(B/3)=3*b/B, using B/3, which has a low bandwidth and a large impact on latency. In this arrangement, the latency of the stream data 2 from the FPGA 200 to the GPU 3 is calculated as 5*b/B+3*b/B=8*b/B.

For the transfer path of the stream data 2 from the FPGA 200 to the GPU 1, a worst-case latency of the stream data 2 from the FPGA 200 to the CXL memory 2 is calculated as b/(B/5)=5*b/B, which is the same as the latency calculated for the GPU 3.

For the transfer path of the stream data 2 from the CXL memory 2 to the GPU 1, the bandwidth for each stream data from the CXL memory 2 to the PCIe switch 500 is B/3, which is the same as the bandwidth calculated for the GPU 3. The bandwidth for each stream data from the PCIe switch 500 to the GPU 1 is B/4. In this arrangement, a worst-case latency of the stream data 2 from the CXL memory 2 to the GPU 1 is calculated as b/(B/4)=4*b/B, using B/4, which has a low bandwidth and a large impact on latency. In this arrangement, the latency of the stream data 2 from the FPGA 200 to the GPU 1 is calculated as 5*b/B+4*b/B=9*b/B.

For the transfer path of the stream data 2 from the FPGA 200 to the GPU 2, a worst-case latency of the stream data 2 from the FPGA 200 to the CXL memory 2 is calculated as b/(B/5)=5*b/B, which is the same latency calculated for the GPU 3.

For the transfer path of the stream data 2 from the CXL memory 2 to the GPU 2, the bandwidth for each stream data from the CXL memory 2 to the PCIe switch 500 is B/3, which is the same as the bandwidth calculated for the GPU 3. The bandwidth for each stream data from the PCIe switch 500 to the GPU 2 is B/3. In this arrangement, a worst-case latency of the stream data 2 from the CXL memory 2 to the GPU 1 is calculated as b/(B/3)=3*b/B, using B/3. In this arrangement, the latency of the stream data 2 from the FPGA 200 to the GPU 1 is calculated as 5*b/B+3*b/B=8*b/B.

Here, a required processing latency may differ depending on the processing of each of the GPUs 1 to 4. For example, when stream data is used for video processing in autonomous vehicle driving, the stream data processed by the GPU needs to be fed back to the vehicle control immediately, and thus a low latency such as in milliseconds is required. On the other hand, when stream data is used for video processing of a surveillance camera to be checked by a human, a high latency such as in seconds or minutes is acceptable.

For example, it is assumed that the processing of the stream data 2 by the GPUs 1 and 2 does not require a low latency (for example, the latency of 10*b/B), but the processing of the stream data 2 by the GPU 3 requires a low latency (for example, the latency of 5*b/B). In this case, for the transfer path illustrated in FIG. 8, latencies "9*b/B" and "8*b/B" of the stream data 2 from the FPGA to the GPUs 1 and 2 satisfy the latency performance requirement "10*b/B" for the GPUs 1 and 2. On the other hand, the latency "8*b/B" of the stream data 2 from the FPGA to the GPU 3 does not satisfy the latency performance requirement "5*b/B" for the GPU 3.

$$GPU\ 1 = 9*b/B\ (\leq 10*b/B)$$

$$GPU\ 2 = 8*b/B\ (\leq 10*b/B)$$

$$GPU\ 3 = 8*b/B\ (>5*b/B)$$

The latency "8*b/B" of the stream data 2 from the FPGA to the GPU 3 is an example of a first latency. The latency performance requirement "5*b/B" for the GPU 3 is an example of a preset second latency. The stream data 2 is an example of excess data for which the first latency exceeds the second latency.

FIG. 11 illustrates an example of various tables provided in the transfer control unit 300 to resolve the problem of not satisfying the latency requirement. Detailed description of the same elements as in FIG. 7 is omitted. Each table in FIG. 11 illustrates a state of the stream data transfer operation illustrated in FIG. 8. The data amount management table 301, the transfer destination management table 302, and the area management table 303 are the same as in FIG. 7. In the memory management table 304, entries for GPUs 1 to 4 in internal memories 1 to 3 are added to the memory management table 304 illustrated in FIG. 7. The latency management table 305 is newly provided in FIG. 7.

In the memory management table 304, a state of entries for the host memory and the CXL memories 1 and 2 is the same as in FIG. 7. In FIG. 8, the internal memories 1 to 4 of the GPUs 1 to 4 are not used instead of the internal memory 201 of the FPGA 200. In this case, in the memory management table 304, available capacities $C_{G1}$, $C_{G2}$, $C_{G3}$, and $C_{G4}$ Of entries for the GPUs 1 to 4 are respectively set to storage capacities of the internal memories 1 to 4 in the GPUs 1 to 4.

In FIG. 8, the GPU 1 receives stream data having a transfer rate of 4b (=0.8B) from the PCIe switch 500, and does not send the stream data to the PCIe switch 500. In this arrangement, in the entry for the GPU 1 in the memory management table 304, an upstream available bandwidth is set to 0.2B (=B−0.8B) and a downstream available bandwidth is set to B (=B−0).

The GPU 2 receives stream data of 3*b* (=0.6B) from the PCIe switch 500, and does not send the stream data to the PCIe switch 500. In this arrangement, in the entry for the GPU 2 in the memory management table 304, an upstream available bandwidth is set to 0.4B (=B−0.6B) and a downstream available bandwidth is set to B (=B−0).

The GPU 3 receives stream data of 2*b* (=0.4B) from the PCIe switch 500, and does not send the stream data to the PCIe switch 500. In this arrangement, in the entry for the GPU 2 in the memory management table 304, an upstream available bandwidth is set to 0.6B (=B−0.4B) and a downstream available bandwidth is set to B (=B−0).

The GPU 4 receives stream data of b (=0.2B) from the PCIe switch 500, and does not send the stream data to the PCIe switch 500. In this arrangement, in the entry of the GPU 2 of the memory management table 304, an upstream available bandwidth is set to 0.8B (=B−0.2B) and a downstream available bandwidth is set to B (=B−0).

The latency management table 305 has an entry for storing the latency performance requirement for each of the stream data 1 to 4, for each of the GPUs 1 to 4. In the latency management table 305, the latency performance requirements "10*b/B," "10*b/B," and "5*b/B" for the stream data 2 illustrated in FIG. 10 are respectively stored in entries of GPUs 1 to 3. The latency performance requirement for each of stream data 1, 2, and 4 is sufficiently high in the latency management table 305, and information indicating "no requirements" is stored in each entry.

Figure 12:
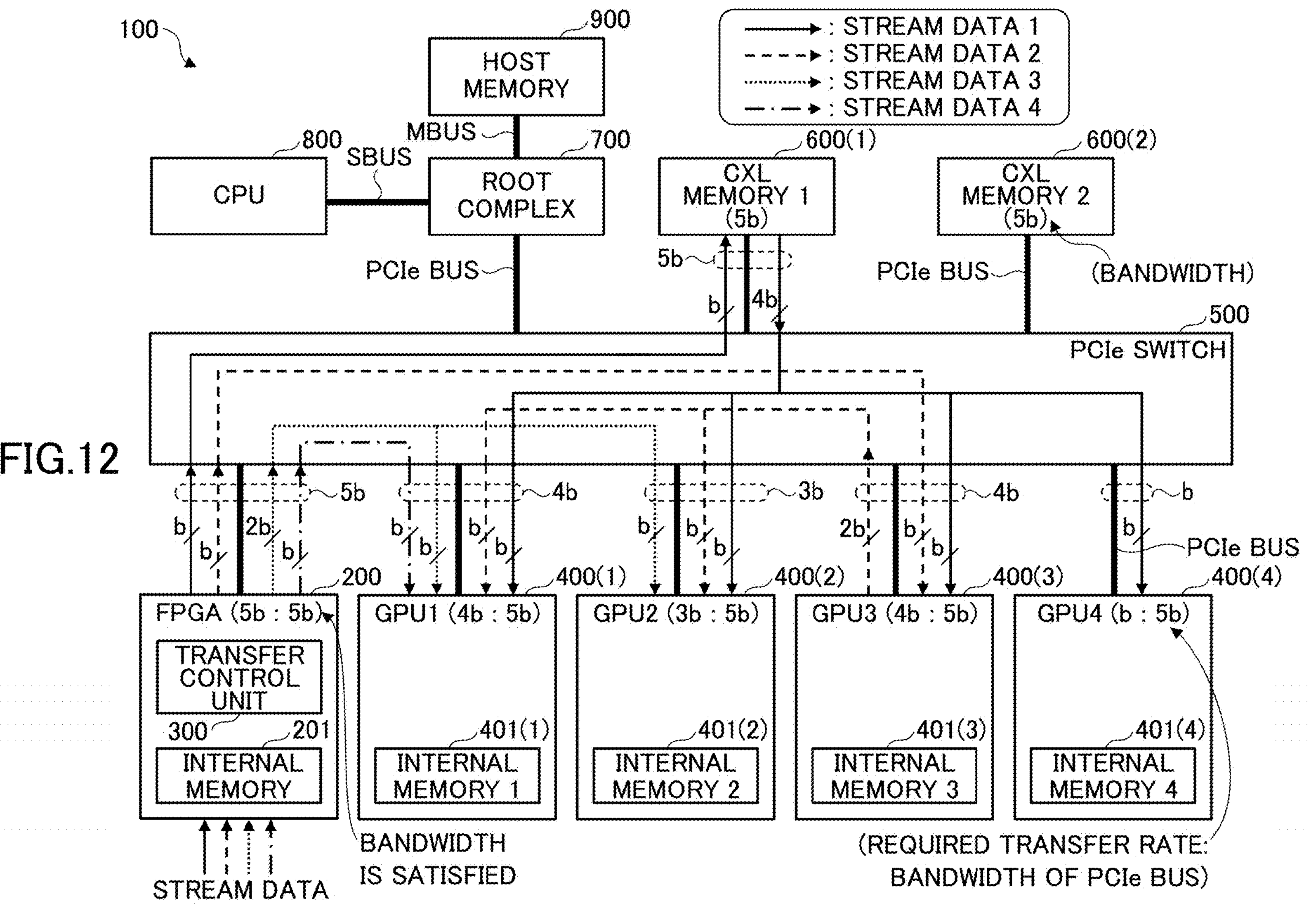
FIG. 12 is a diagram illustrating an operational example of resolving the problem of not satisfying the latency requirement in the information processing device illustrated in FIG. 3.

FIG. 12 illustrates an operational example of resolving the problem of not satisfying the latency requirement in the information processing device 100 of FIG. 3. Detailed description of the operation that is similar to that in FIGS. 4 and 8 is omitted. In FIG. 12, the FPGA 200 stores the preprocessed stream data 2 in the internal memory 3 of the GPU 3. The GPU 3 processes data of the stream data 2 stored in the internal memory 3. Each of GPUS 1 and 2 reads and processes the stream data 2 from the internal memory 3 of the GPU 3. The transfer paths of stream data 1, 3, and 4 are the same as those in FIG. 8.

In this arrangement, in FIG. 12, the stream data 2 is transferred from the FPGA 200 to the internal memory 3 of the GPU 3 without using the CXL memory 2. With this approach, the transfer latency of the stream data 2 between the PCIe switch 500 and the CXL memory 2, which occurs when the stream data 2 is passed through the CXL memory 2 illustrated in FIG. 8, can be eliminated.

FIG. 13 illustrates an example of setting various tables of the transfer control unit 300 for the transfer paths of stream data 1 to 4 illustrated in FIG. 12. FIG. 13 is the same as FIG. 11 except that the settings of the area management table 303 and the memory management table 304 are different from those of FIG. 11. Shaded entries indicate changes from FIG. 11.

In the area management table 303, a device for storing the stream data 2 is set for the GPU 3, and an address space for storing the stream data 2 is set as the address space 0x6000-0x6100 allocated to the internal memory 3 of the GPU 3. Other settings of the area management table 303 are the same as those in FIG. 11.

In the memory management table 304, the CXL memory 2, which is not used for transferring the stream data, is set to an initial state. In addition, an available capacity of the internal memory 3 in the GPU 3 used for transferring the stream data 2 is set as "$C_{G3}$-0x100," and an available downstream bandwidth of the GPU 3 is set to 0.6B. Other settings of the memory management table 304 are the same as those in FIG. 11.

FIG. 14 illustrates an example of calculating the latency until the stream data 2 arrives from the FPGA 200 to GPUs 1 to 3 along the data transfer path of FIG. 12. Detailed description of the same elements as in FIG. 10 is omitted.

For the latency from the FPGA 200 to the GPU 3, the stream data 2 is stored in the internal memory 3 of the GPU 3 via the PCIe switch 500 from the FPGA 200. In this arrangement, the latency from the FPGA 200 to the GPU 3 is calculated as b/(B/5)=5*b/B, using only B/5, which has a low bandwidth and a large impact on the latency. In this case, by holding the stream data 2 in the internal memory 3 of the GPU 3, the latency performance requirement “5*b/B” for the stream data 2 of the GPU 3 as set in the latency management table 305 can be satisfied.

For the latency from the FPGA 200 to the GPU 1, a worst-case latency of the stream data 2 from the FPGA 200 to the GPU 3 along the transfer path of the stream data 2 is calculated as b/(B/5)=5*b/B, which is the same as the latency calculated for the GPU 3. For the transfer path of the stream data 2 from the GPU 3 to the GPU 1, the bandwidth for each stream data from the GPU 3 to the PCIe switch 500 is B/2. The bandwidth for each stream data from the PCIe switch 500 to the GPU 1 is B/4.

In this arrangement, a worst-case latency of the stream data 2 from the GPU 3 to the GPU 1 is calculated as b/(B/4)=4*b/B, using B/4, which has a low bandwidth and a large impact on latency. As a result, the latency of the stream data 2 from the FPGA 200 to the GPU 1 is calculated as 5*b/B+4*b/B=9*b/B. In this case, the latency performance requirement “10*b/B” for the stream data 2 to the GPU 1 as set in latency management table 305 can be satisfied.

For the latency from the FPGA 200 to the GPU 2, a worst-case latency of the stream data 2 from the FPGA 200 to the GPU 3 along the transfer path of the stream data 2 is calculated as b/(B/5)=5*b/B, which is the same as the latency calculated for the GPU 3. For the transfer path of the stream data 2 from the GPU 3 to the GPU 2, the bandwidth for each stream data from the GPU 3 to the PCIe switch 500 is B/2, which is the same as the bandwidth calculated for the GPU 1. The bandwidth per stream data from the PCIe switch 500 to the GPU 2 is B/3.

In this arrangement, a worst-case latency of the stream data 2 from the GPU 3 to the GPU 2 is calculated as b/(B/3)=3*b/B, using B/3, which has a low bandwidth and a large impact on latency. As a result, the latency of the stream data 2 from the FPGA 200 to the GPU 2 is calculated as 5*b/B+3*b/B=8*b/B. In this case, the latency performance requirement “10*b/B” for the stream data 2 to the GPU 2 as set in the latency management table 305 can be satisfied.

Figure 15:
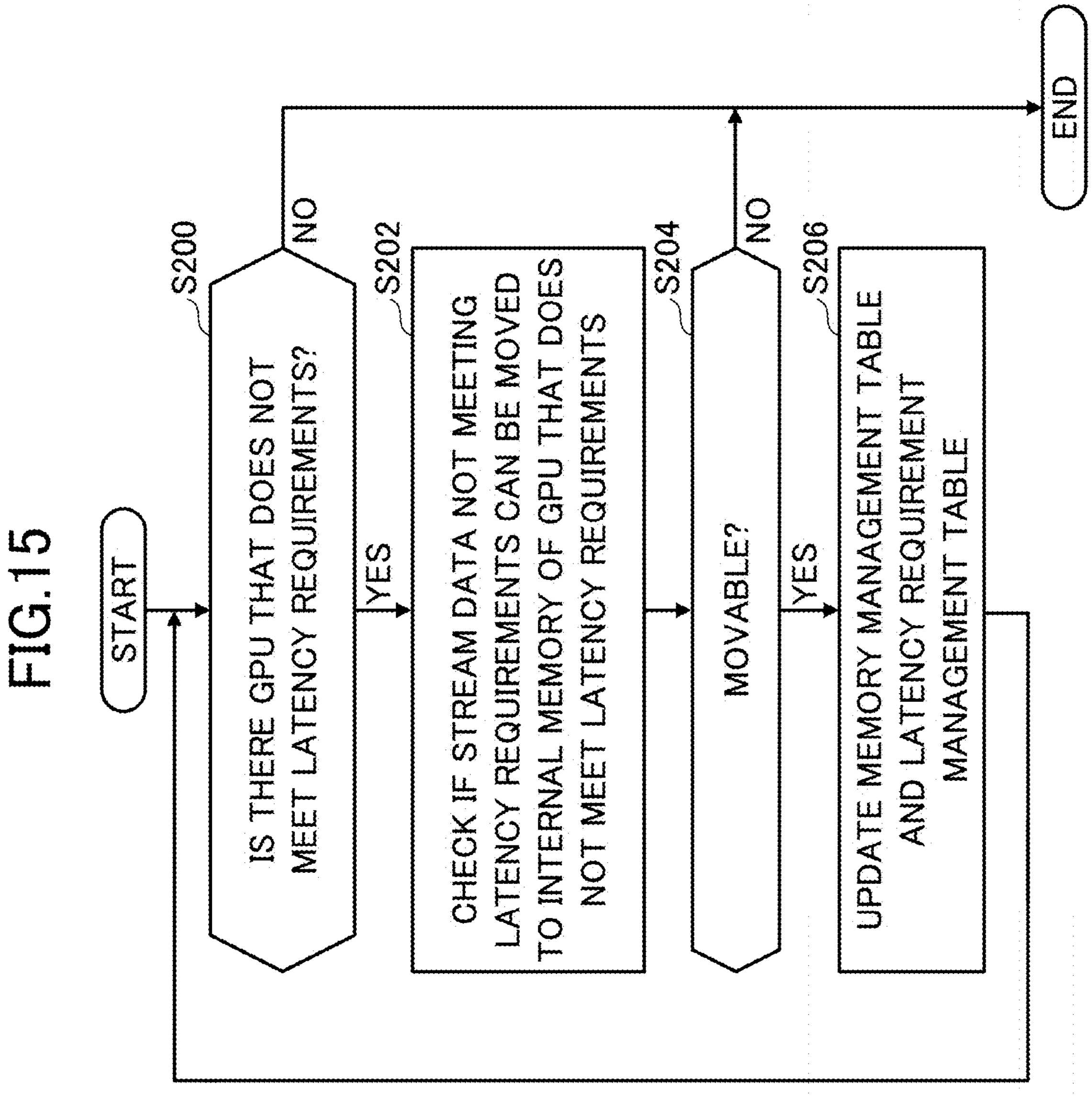
FIG. 15 is a flow diagram illustrating an operational example of determining the transfer path of the stream data illustrated in FIG. 12.

FIG. 15 illustrates an operational flow example of determining the transfer path of the stream data illustrated in FIG. 12. The operation that is similar to that illustrated in FIG. 9 will not be described in detail. The operation illustrated in FIG. 15 is performed by the transfer control unit 300 when stream data is added and deleted, when GPU workloads using each stream data are added and deleted, and when a CXL memory is added and deleted.

First, in step S200, the transfer control unit 300 refers to the latency management table 305, and determines whether there is a GPU that does not satisfy a latency requirement. That is, the transfer control unit 300 determines whether there is excess data for which the latency of stream data from the FPGA 200 to each GPU 400 exceeds a latency performance requirement.

If there is a GPU 400 that does not satisfy the latency requirement, the transfer control unit 300 performs step S202 because it is difficult for the GPU 400 to perform normal processing of stream data that does not satisfy the latency requirement. If there is no GPU 400 that does not satisfy the latency requirement, the transfer control unit 300 terminates the operation illustrated in FIG. 12 because the GPU 400 can perform normal data processing of the stream data.

In step S202, the transfer control unit 300 refers to the data amount management table 301, the transfer destination management table 302, the memory management table 304, and the latency management table 305. Then, the transfer control unit 300 checks whether the stream data that does not satisfy the latency requirement can be moved to the internal memory 401 of the GPU 400 that does not satisfy the latency requirement. If there is a plurality of GPUs 400 that do not satisfy the latency requirement, the transfer control unit 300 selects one of the plurality of GPUs 400. Here, “can be moved” means that there is an available space in a target memory to which stream data is to be moved. and that the performance requirements (bandwidth) of all GPUs 400 that use the stream data moved to the target memory are satisfied.

Next, in step S204, if the stream data can be moved to one of the internal memories 401 of the GPUs 400 based on the processing result in step S202, the transfer control unit 300 performs step S206. If the latency requirement cannot be satisfied even if the stream data is moved to one of the internal memories 401 of the GPUs 400, the transfer control unit 300 terminates the operation illustrated in FIG. 15. In this case, by distributing and processing a plurality of stream data through a plurality of information processing devices 100, the latency requirements are satisfied.

Next, in step S206, the transfer control unit 300 updates the area management table 303 and the memory management table 304 with respect to FIG. 11, as illustrated in FIG. 13. In this arrangement, a transfer destination of the stream data 2 that does not satisfy the latency requirement can be changed to the internal memory 3 of the GPU 3 that is selected in step S202. Then, the transfer control unit 300 returns to the operation in step S100. The operation illustrated in FIG. 15 may be performed after the operation illustrated in FIG. 9, or together with the operation illustrated in FIG. 9.

As described above, the present embodiment can provide the same effect as the above-described embodiments. For example, the stream data can be transferred from the FPGA 200 to a plurality of GPUs 400 without exceeding the bandwidth of the PCIe bus that connects the FPGA 200 and the PCIe switch 500. In other words, even when the number of parallel stream data transferred from the FPGA 200 to the PCIe switch 500 is reduced in order to suppress exceeding the bandwidth, a predetermined number of data items can be transferred to each of the GPUs 400. In this arrangement, the GPUs 400 can receive and process the stream data normally without missing the stream data, and the information processing device 100 can operate normally.

In addition, in the present embodiment, when a transfer latency of stream data does not satisfy the processing latency of the GPU 400, the FPGA 200 transfers the stream data from the FPGA 200 to the internal memory 401 of the GPU 400 without using the CXL memory 600. The stream data is not held in the CXL memory 600, and the transfer latency of the stream data between the PCIe switch 500 and the CXL memory 600, which occurs when the stream data is passed through the CXL memory 600, can be eliminated. As a result, the transfer latency of the stream data can be set to be equal to or less than the latency performance requirement, and the GPU 400 can receive and process the stream data normally without missing the stream data. As a result, the information processing device 100 can operate normally.

The transfer control unit 300 is mounted in the FPGA 200 that receives stream data. In this arrangement, the transfer control unit 300 can set information in various tables, such as the data amount management table 301 and the transfer destination management table 302, using setting information that is set in the FPGA 200. In other words, the transfer control unit 300 can set information in various tables without communicating with the FPGA 200 that is arranged externally.

Although the embodiments are numbered with, for example, "first" or "second," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data transfer controller for controlling transfer of a plurality of data items from a first device to a plurality of second devices, the data transfer controller comprising:

a processor configured to:

when the data transfer controller is mounted on an information processing device including the first device configured to receive the plurality of data items, the plurality of second devices configured to receive and process the plurality of data items that are transmitted in parallel from the first device, at least one first memory configured to store one or more of the plurality of data items, and a switch configured to interconnect the first device, the plurality of second devices, and the at least one first memory, transfer at least one data item of the plurality of data items that is to be transferred from the first device to the plurality of second devices, to the at least one first memory, upon occurrence of a condition in which an hourly transfer volume of the plurality of data items transferred from the first device to the switch exceeds a bandwidth between the first device and the switch; and cause the plurality of second devices to acquire the at least one data item that is stored in the at least one first memory.

2. The data transfer controller according to claim 1, wherein the at least one first memory includes a plurality of first memories, and wherein upon occurrence of a condition in which the plurality of data items are transferred from the first device to the respective second devices, in conjunction with a condition in which the hourly transfer volume of the plurality of data items transferred from the first device to the switch exceeds the bandwidth between the first device and the switch, the processor is configured to repeat determining, among the plurality of first memories, a target first memory to which each data item of the plurality of data items is to be transferred, in order starting from the data item having a highest hourly transfer volume from the first device, until the hourly transfer volume is equal to or less than the bandwidth between the first device and the switch.

3. The data transfer controller according to claim 2, further comprising:

a memory management table that stores information indicating an available capacity of each of the plurality of first memories, wherein upon occurrence of the condition in which the plurality of data items are to be transferred from the first device to the respective second devices, in conjunction with the condition in which the hourly transfer volume of the plurality of data items transferred from the first device to the switch exceeds the bandwidth between the first device and the switch, the processor is configured to refer to the memory management table to determine the target first memory to which each data item of the plurality of data items is to be transferred, in order starting from the data item having a largest available capacity from the first device.

4. The data transfer controller according to claim 2, further comprising:

a data amount management table that stores information indicating a data amount per unit time of the plurality of data items that are to be received by the first device; and a transfer destination management table that stores information indicating the plurality of second devices to which the respective data items are transferred, wherein the processor is configured to refer to the data amount management table and the transfer destination management table to determine whether the hourly transfer volume exceeds the bandwidth between the first device and the switch, and determine the data item having a higher hourly transfer volume from the first device, than other data items.

5. The data transfer controller according to claim 1, wherein the processor is configured to transfer the excess data to a second memory of any one of the plurality of second devices, without using the first memory, upon occurrence of a condition in which there is excess data for which a first latency of the data item from the first device to a target second device, among the plurality of second devices, through the first memory exceeds a preset second latency.

6. The data transfer controller according to claim 5, further comprising:

a latency management table that stores the preset second latency, for each of the plurality of data items that are to be transferred to the respective second devices, wherein the processor is configured to refer to the latency management table to determine whether the excess data exists.

7. An information processing device comprising:

a first device configured to receive a plurality of data items;

a plurality of second devices configured to receive and process the plurality of data items that are transmitted in parallel from the first device;

at least one first memory configured to store one or more of the plurality of data items;

a switch configured to interconnect the first device, the plurality of second devices, and the at least one first memory; and a data transfer controller configured to control transfer of the plurality of data items from the first device to the plurality of second devices, transfer at least one data item of the plurality of data items that is to be transferred from the first device to the plurality of second devices, to the at least one first memory, upon occurrence of a condition in which an hourly transfer volume of the plurality of data items transferred from the first device to the switch exceeds a bandwidth between the first device and the switch, and cause the plurality of second devices to acquire the at least one data item that is stored in the at least one first memory.

8. The information processing device according to claim 7, further comprising:

an area management table that stores information indicating the at least one first memory to which the at least one data item of the plurality of data items is transferred, and a destination address in association with the at least one first memory, wherein each of the plurality of second devices is configured to determine a target first memory from which the at least one data item is to be retrieved for processing.

9. The information processing device according to claim 7, wherein the data transfer controller is included in the first device.

* * * * *